(12) United States Patent
Teramachi et al.

(10) Patent No.: US 7,296,930 B2
(45) Date of Patent: Nov. 20, 2007

(54) ROLLING GUIDE DEVICE AND MANUFACTURING METHOD THEREOF, AND DRIVING DEVICE INCLUDING THE ROLLING GUIDE DEVICE

(75) Inventors: Akihiro Teramachi, Tokyo (JP); Masakazu Uesugi, Tokyo (JP); Takeki Shirai, Tokyo (JP)

(73) Assignee: THK Co., Ltd, Tokyo (JP)

( * ) Notice: Subject to any disclaimer, the term of this patent is extended or adjusted under 35 U.S.C. 154(b) by 0 days.

(21) Appl. No.: 09/952,030

(22) Filed: Sep. 14, 2001

(65) Prior Publication Data

US 2002/0034346 A1    Mar. 21, 2002

(30) Foreign Application Priority Data

Sep. 18, 2000    (JP)    ............... 2000-282259

(51) Int. Cl.
*F16C 29/06*    (2006.01)
*F16C 29/04*    (2006.01)

(52) U.S. Cl. .................. 384/45; 384/43; 384/49

(58) Field of Classification Search .................. 384/43, 384/45, 46, 47, 49, 55, 57, 59, 44; 464/168
See application file for complete search history.

(56) References Cited

U.S. PATENT DOCUMENTS

| | | | | |
|---|---|---|---|---|
| 2,945,366 A | * | 7/1960 | Sears ....................... 464/168 |
| 3,940,186 A | * | 2/1976 | Nilsson .................... 384/43 X |
| 4,030,191 A | * | 6/1977 | Ernst et al. ............... 384/43 X |
| 4,441,765 A | * | 4/1984 | Kasai et al. .................. 384/45 |
| 4,444,443 A | * | 4/1984 | Teramachi et al. ........... 384/45 |
| 4,629,337 A | * | 12/1986 | Teramachi ................... 384/43 |
| 4,630,941 A | * | 12/1986 | Chainer et al. ................ 384/1 |
| 4,659,239 A | * | 4/1987 | Teramachi et al. ........... 384/45 |
| 4,695,170 A | * | 9/1987 | Teramachi ................... 384/45 |
| 4,789,249 A | * | 12/1988 | Mutolo ....................... 384/43 |
| 5,118,204 A | * | 6/1992 | Peters ..................... 384/43 X |
| 5,431,498 A | * | 7/1995 | Lyon ......................... 384/45 |
| 5,613,780 A | * | 3/1997 | Ng ............................ 384/43 |
| 5,620,259 A | * | 4/1997 | Mainardi .................. 384/57 X |
| 5,718,515 A | * | 2/1998 | Furuhashi ................... 384/53 |

(Continued)

FOREIGN PATENT DOCUMENTS

JP    60-88218    *    5/1985

*Primary Examiner*—Thomas R. Hannon
*Assistant Examiner*—Justin Krause
(74) *Attorney, Agent, or Firm*—Westerman, Hattori, Daniels & Adrian, LLP.

(57) ABSTRACT

There are provided a rail (10) in which a rolling member rolling surface (11) is formed along the longitudinal direction, a block (20) in which a loaded rolling member rolling surface (27) is formed in an opening (25) comprising a through hole, a plurality of balls (70) disposed and housed between the rolling member rolling surface (11) and the loaded rolling member rolling surface (27) which circulate according to the relative motion of the rail (10) and the block (20). A sectional shape at right angles to the longitudinal direction of the rail (10) and a sectional shape of the opening (25) are formed into a mutually geometrically similar longitudinal shape. The block (20) is a box type with high rigidity. A contact angle of the ball (70) can be optionally changed by changing the positions alone of the rolling member rolling surface 11 and the loaded rolling member rolling surface (27) to be machined on one type of the block (20) and the rail (10).

6 Claims, 8 Drawing Sheets

U.S. PATENT DOCUMENTS 6,158,890 A * 12/2000 Hattori ........................ 384/45
6,174,086 B1 * 1/2001 Ng et al. ...................... 384/45
6,200,225 B1 * 3/2001 Hobaugh, II .............. 384/49 X
2002/0001419 A1 * 1/2002 Nakajima .................... 389/49

* cited by examiner

PRIOR ART

Fig 8

ROLLING GUIDE DEVICE AND MANUFACTURING METHOD THEREOF, AND DRIVING DEVICE INCLUDING THE ROLLING GUIDE DEVICE

BACKGROUND OF THE INVENTION

The present invention relates to a rolling guide device in which a block and a rail are relatively linearly movably engaged to each other via rows of infinitely circulating rolling members, a manufacturing method thereof, and a driving device including the rolling guide device.

Heretofore, there has been known a rolling guide device in which a block and a rail are linearly movably engaged to each other via a plurality of rolling members comprising infinitely circulating balls and rollers. To be specific, as shown in FIG. 8, the rolling guide device comprises a rail 80, a block 90 having a recess 93 formed on a lower surface thereof in which the rail 80 fits, and a number of rolling members 100 interposed so as to form a row between a rolling member rolling surface 81 of the rail 80 and a loaded rolling member rolling surface 91 of the block 90.

Here, the block 90 is provided with rolling member release holes 94 through which the rolling members 100 passed between each pair of the rolling member rolling surface 81 and the loaded rolling member rolling surface 91 are released and returned to an original position again to from an infinite circulation passage of the rolling members 100.

Furthermore, when the block 90 is linearly moved relatively along the rail 80, the rolling member's 100 are linearly moved while they roll between the rolling member rolling surface 81 and the loaded rolling member rolling surface 91, passed between the rolling member rolling surface 81 and the loaded rolling ember rolling surface 91, returned to the rolling member release hole 94 through a return passage provided in an end plate (not shown), and then supplied again between the rolling member rolling surface 81 and the loaded rolling member rolling surface 91.

Figure 8:
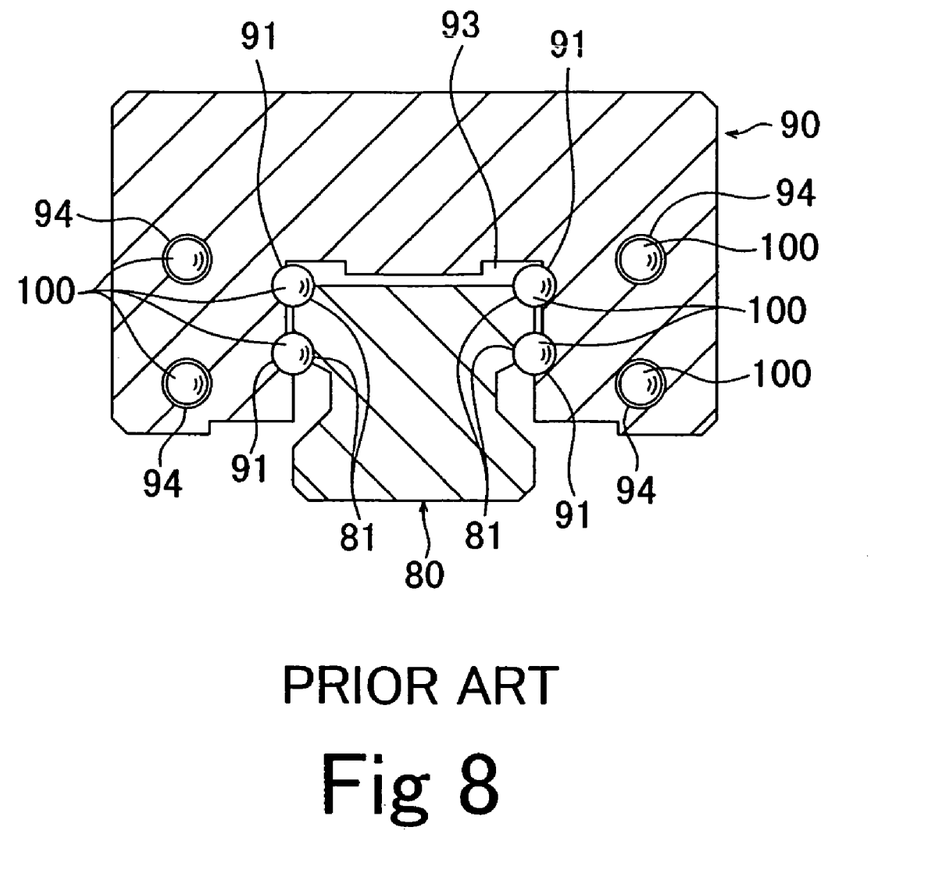
FIG. 8 is a cross-sectional view showing a conventional rolling guide device.

However, for example, in the case that the block 90 is fixed and the rail 80 is moved in the aforesaid rolling guide device, and when a heavy piece is installed at a rail tip portion of the forward side of the rail 80 in FIG. 8 and a moment load is applied thereonto, the load imparts an uneven deformation onto the block 90, so that a deformation amount (an opening amount of the recess 93) is varied on the forward side and the backward side of the block 90 in FIG. 8, which leads to a problem that the position accuracy of the rail 80 is impaired.

In order to solve this problem, instead of the recess 93, a through hole may be provided at the center of the block 90 to pass the rail 80 through the inside of the through hole. If constituted in this manner, even in the case that an uneven load is applied onto one side of the rail 80 and the moment load is generated, the recess 93 will not be opened, so that the rail 80 can always securely be held.

However, even in the rolling guide device constituted in such a manner, machining positions of the opposing rolling member rolling surface 81 and the loaded rolling member rolling surface 91 are required to be changed to various positions (various contact angle positions) in accordance with purposes of use, and hence, the shape of an opening 25 of the block 90 and the external shape of the rail 80 must also be changed in accordance with the above change, thereby causing a complicated problem.

SUMMARY OF THE INVENTION

Therefore, an object of the present invention is to provide a rolling guide device in which even if a large moment is applied to a rail, a block is not deformed, and even if machining positions of a rolling member rolling surface 81 and a loaded rolling member rolling surface 91 are simultaneously changed, the shape itself of the block and the rail is not required to be changed, a manufacturing method thereof, and a driving device including the rolling guide device.

A first aspect of the present invention is directed to a rolling guide device which comprises a rail in which a rolling member rolling surface is formed along its longitudinal direction, a block in which an opening comprising a through hole is formed, the rail being fitted in this opening, and a rolling member circulation passage including a loaded rolling member rolling surface corresponding to the rolling member rolling surface of the rail is formed, and a plurality of rolling members which are disposed and housed in the rolling member circulation passage and which circulate in accordance with the relative movement of the rail and block, wherein a sectional shape at right angles to the longitudinal direction of the rail and a sectional shape of the opening of the block are formed into a mutually geometrically similar longitudinal shape. In this manner, the opening of the block is made to be a through hole, and therefore, the block is a box type block of high rigidity which will not be deformed, so that it is possible to sufficiently maintain a satisfactory position accuracy of the rail even if a large moment is applied thereonto. In addition, according to the present invention, by appropriately changing the machining positions alone of the rolling member rolling surface and the loaded rolling member rolling surface, it becomes possible to optionally change a contact angle of the rolling members by one type of block and rail. Therefore, even in the case that the purpose of use and the condition of use are different by each user, it is possible to cope with these situations, thereby enabling the manufacture of the rolling guide device easily and at a low price.

A second aspect of the present invention is directed to the rolling guide device in which the sectional shape at right angles to the longitudinal direction of the rail and the sectional shape of the opening of the block are mutually formed into a curved line with respect to a part in which the rolling member rolling surface and loaded rolling member rolling surface are formed. In this manner, by forming the part of both sectional shapes into a curved line, it is possible to change the contact angle easily by changing the positions of the rolling member rolling surface and the loaded rolling member rolling surface as described above.

Moreover, a third aspect of the present invention, in the rolling guide device, is to provide a constitution in which the curved line is part of a round shape. If the curved line is a round shape, the relation between the position and the contact angle of the aforesaid rolling member rolling surface and the loaded rolling member rolling surface becomes most important, since the position of each rolling surface can be changed with high accuracy, it is thus possible to change and set the contact angle with high accuracy.

A fourth aspect of the present invention is directed to the rolling guide device in which the curved line is a part of an ellipse. If the curved line is an ellipse, though the relation of the aforesaid rolling member rolling surface and loaded rolling member rolling surface to the contact angle is not simple as in the case of the aforesaid round shape, it is possible to easily change the contact angle in proportion to the round shape.

Moreover, a fifth aspect of the present invention is directed to a manufacturing method of a rolling guide device which comprises a process of forming a rolling member rolling surface on a rail along the longitudinal direction, a process of forming a rolling member circulation passage including a loaded rolling member rolling surface corresponding to the rolling member rolling surface of the rail on a block in which an opening comprising a through hole is machined, and a process of inserting the rail into the opening of the block, and disposing and housing, in the rolling member circulation passage, a plurality of rolling members which circulate in accordance with the relative motion of the rail and block, wherein a sectional shape at right angles to the longitudinal direction of the rail and a sectional shape of the opening of the block are machined in advance into a mutually geometrically similar longitudinal shape, and machining positions of both the loaded rolling member rolling surface of the block and the rolling member rolling surface of the rail are appropriately changed, whereby the contact angle of the rolling members to the block and rail is optionally changed.

Moreover, a sixth aspect of the present invention is directed to a driving device including a rolling guide device which comprises a rail in which a rolling member rolling surface is formed along the longitudinal direction; a block in which an opening comprising a through hole is formed, the rail fits in this opening, and a rolling member circulation passage including a loaded rolling member rolling surface corresponding to the rolling member rolling surface of the rail is formed; and a plurality of rolling members which are disposed and housed in the rolling member circulation passage and which circulate in accordance with the relative motion of the rail and block; wherein a sectional shape at right angles to the longitudinal direction of the rail and a sectional shape of the opening of the block are formed into a mutually geometrically similar longitudinal shape, and there is disposed a linear motor comprising a secondary side arranged on both the main sides of the rail and a primary side arranged in the opening of the block corresponding to this secondary side.

BRIEF DESCRIPTION OF THE DRAWINGS

FIG. 2 shows a rolling guide device according to an embodiment of the present invention, wherein FIG. 2 (*a*) is a schematic cross-sectional side view FIG. 2 (*b*) is a plan view.

DESCRIPTION OF THE PREFERRED EMBODIMENT

In the following, embodiments of the present invention will be described in detail with reference to the drawings.

Figure 1:
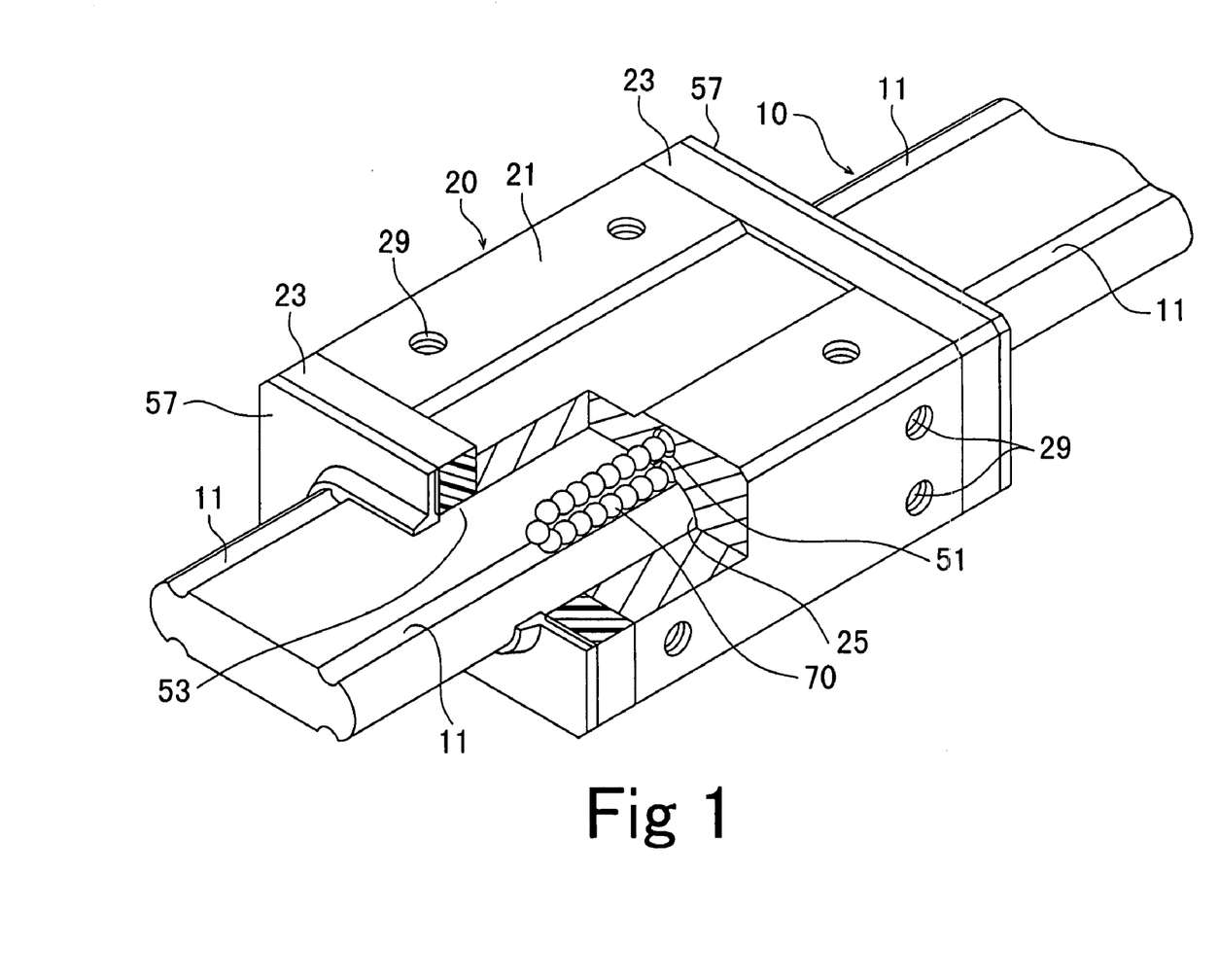
FIG. 1 is a partially cut schematic perspective view of a rolling guide device according to an embodiment of the present invention.
Figure 2:
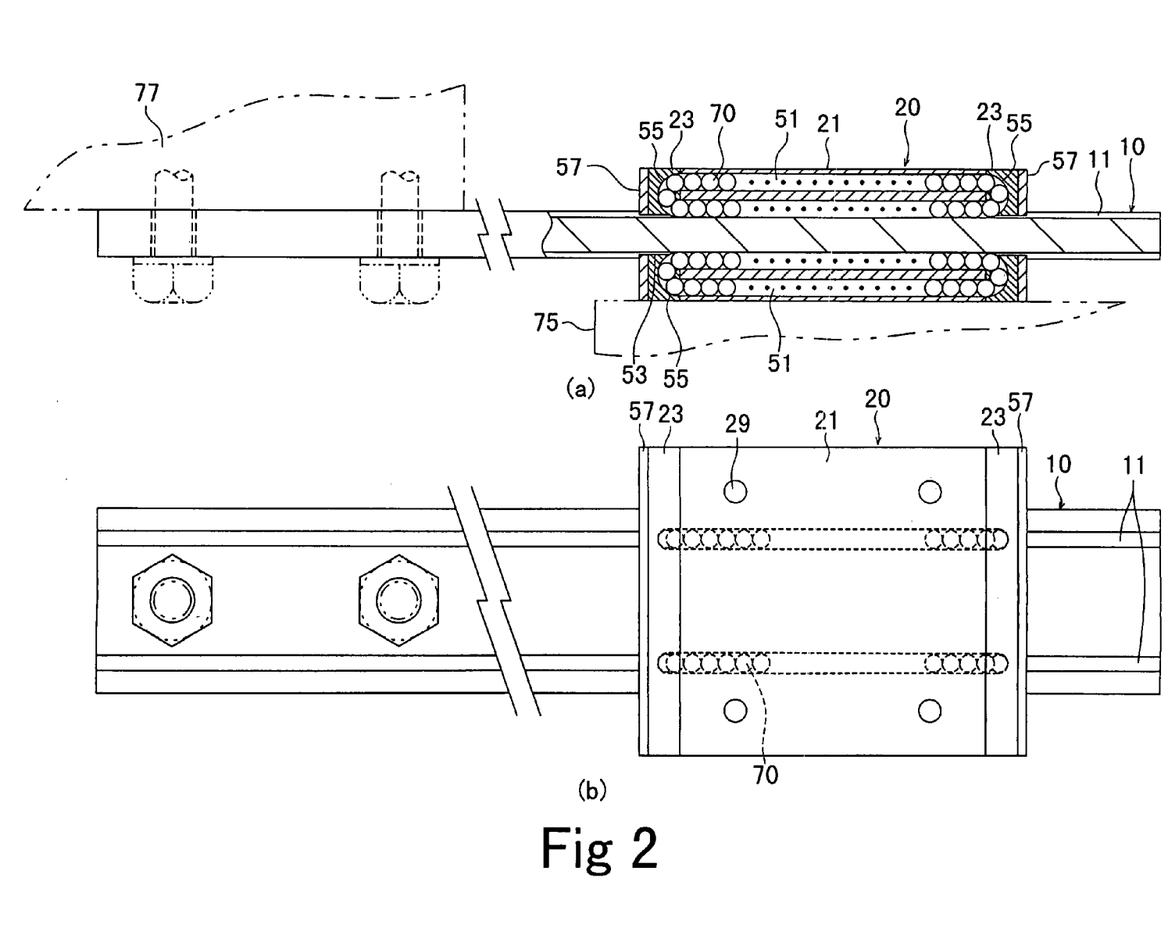
Figure 3:
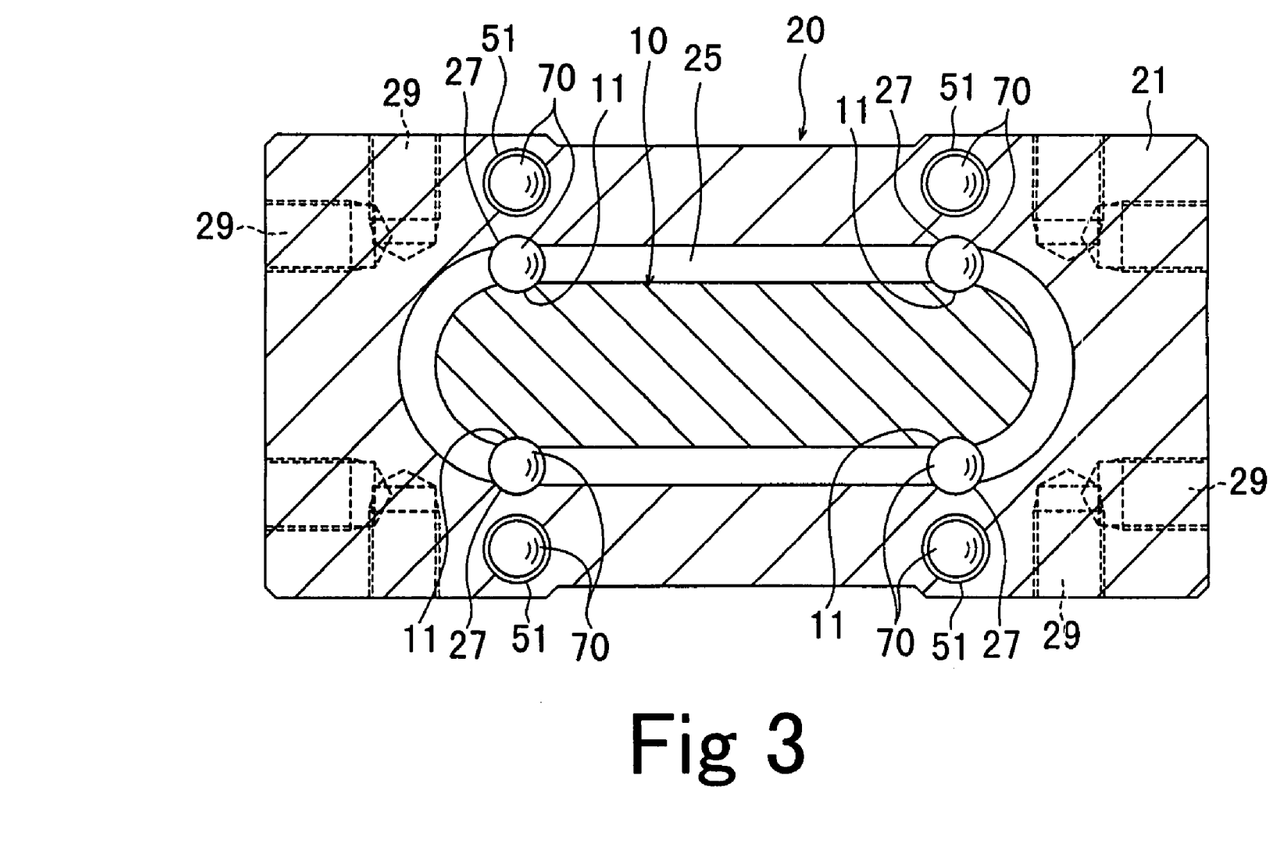
FIG. 3 is a cross-sectional view of a rolling guide device according to an embodiment of the present invention.

FIG. 1 to FIG. 3 show a rolling guide device according to an embodiment of the present invention, FIG. 1 is a partially cut schematic perspective view, FIG. 2 (*a*) is a schematic cut sectional side view, FIG. 2 (*b*) is a plan view, and FIG. 3 is a cross-sectional view. As shown in these drawings, this rolling guide device is constituted of a rail 10, a block 20, and a ball (rolling member) 70.

A cross section of the rail 10 is a longitudinal shape, and to be concrete, upper and lower surfaces are substantially parallel planes in which both sides protrude from the substantially parallel planes in a continuous arc shape. Moreover, on the top and bottom of the rail 10, two groove-like rolling member rolling surfaces 11 are formed at right and left, and hence, four groove-like rolling member rolling surfaces 11 are formed in all.

The block 20 comprises a block body 21 and end plates 23 which are installed on both end faces of the block body 21. The block body 21 is provided with an opening 25 into which the rail 10 is inserted, and on upper and lower surfaces of this opening 25, there are formed four groove-like loaded rolling member rolling surfaces 27 corresponding to the respective rolling member rolling surfaces 11 of the rail 10. Between each of the mutually opposing rolling member rolling surfaces 11 and the loaded rolling member rolling surfaces 27, a plurality of balls (rolling members) 70 . . . are movably interposed.

The opening 25 is a through hole and its sectional shape is a longitudinal shape, and detailedly, upper and lower surfaces are substantially parallel planes in which both sides protrude from the substantially parallel planes in a continuous arc shape. That is, a sectional shape at right angles to the longitudinal direction of the rail 10 and a sectional shape of the opening 25 are formed into a mutually geometrically similar longitudinal shape, in the case of this embodiment, an elliptical shape. Therefore, the outer peripheral surface of the rail 10 and the inner peripheral surface of the opening 25 are parallel, and clearance dimensions of both the surfaces are about the same in any part.

In the block body 21, two rolling member release holes 51 for releasing the balls in a load area corresponding to the respective loaded rolling member rolling surfaces 27 are formed on top and bottom of the opening 25, respectively, and hence the four holes 51 are formed in all. On the other hand, on upper and lower surfaces and on both sides of the block 21, there are provided screw-holes 29 for fixing this block body 21 to other members.

The end plate 23 is constituted of a rectangular member having about the same shape as the end face of the block body 21. At the center thereof, there are an opening 53 for passing the rail 10, and a return passage 55 for forwarding the balls 70 in the load area interposed between the block body 21 and the rail 10 into a rolling member release hole 51 to return the balls to the load area again. In addition, on the outer end face of the end plate 23 is installed a sealing member 57 for preventing dirt from entering the inside and preventing lubricant from leaking from the inside.

Furthermore, a rolling member circulation passage is defined by the loaded rolling member rolling surface 27 corresponding to the rolling member rolling surface 11 of the rail 10, the rolling member release hole 51, and the return passage 55.

As a method for machining the loaded rolling member rolling surface 27 in the block 20, for example, a method can be used in which the opening 25 is perforated in the block 20 by wire cut and the like, and a groove is then formed on the inner surface thereof by grinding only to work the loaded rolling member rolling surface 27.

Then, when the rail 10 is moved linearly in its longitudinal direction to the block 20, the rail 10 smoothly moves as the ball 70 between the rolling member rolling surface 11 of the rail 10 and the loaded rolling member rolling surface 27 of the block 20 moves while rolling.

In the present invention, since the opening 25 is provided in the block 20 and the rail is passed inside thereof, for example, as shown in FIG. 2 (*a*), the block 20 is fixed to a fixing side member 75. On the other hand, even if a moving side member 77 is fixed at the tip section of the rail 10 and a moment load is applied to the rail 10, there does not occur a problem in which the opening 25 is opened and deformed, and the rail 10 always moves smoothly to the same position as in the case where the moving side member 77 is not used, so that it is possible to always maintain satisfactory position accuracy of the moving side member 77.

Figure 4:
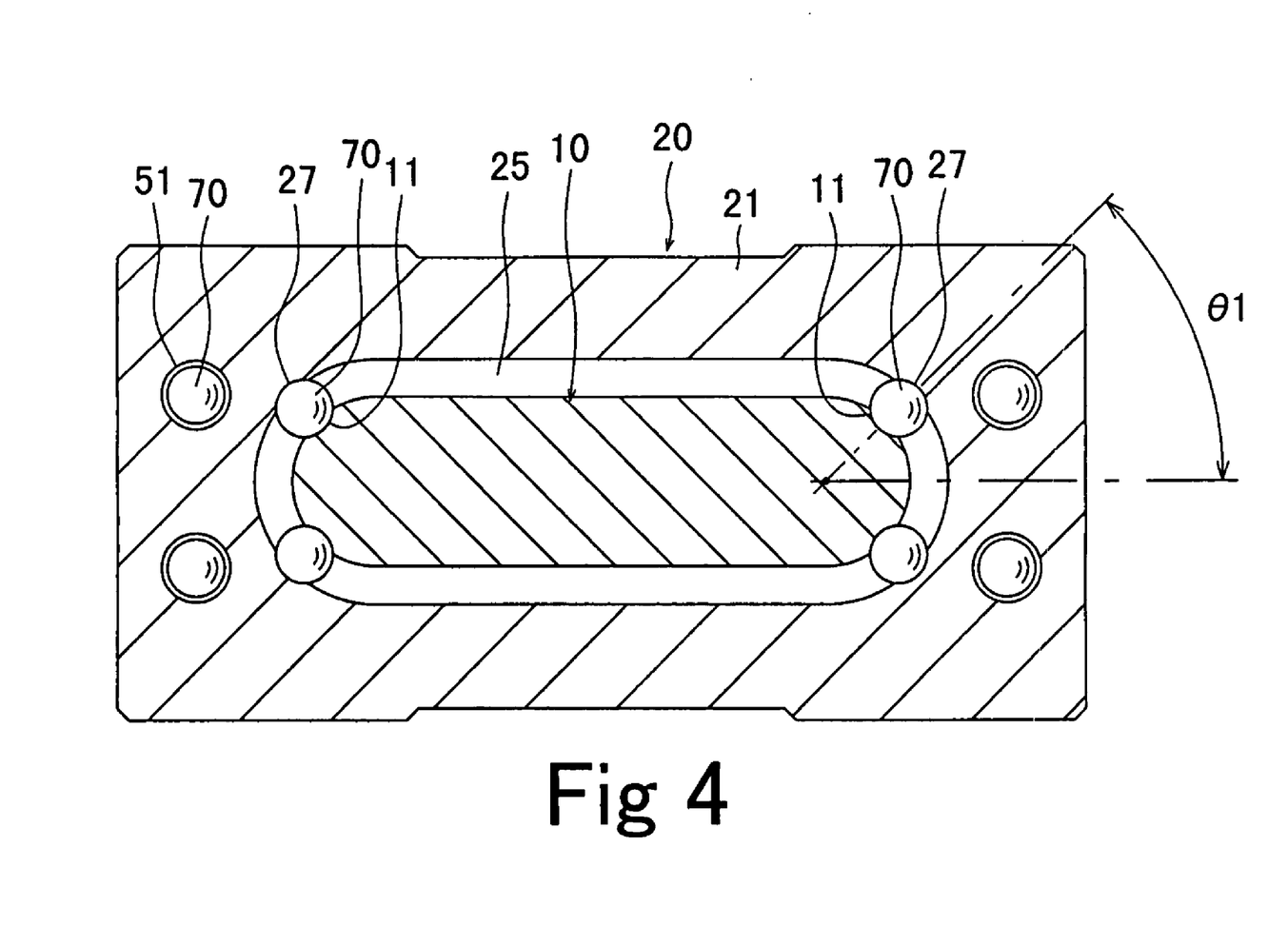
FIG. 4 is a cross-sectional view of a rolling guide device in which machining positions alone of a rolling member rolling surface 11 and a loaded rolling member rolling surface 27 are changed.
Figure 5:
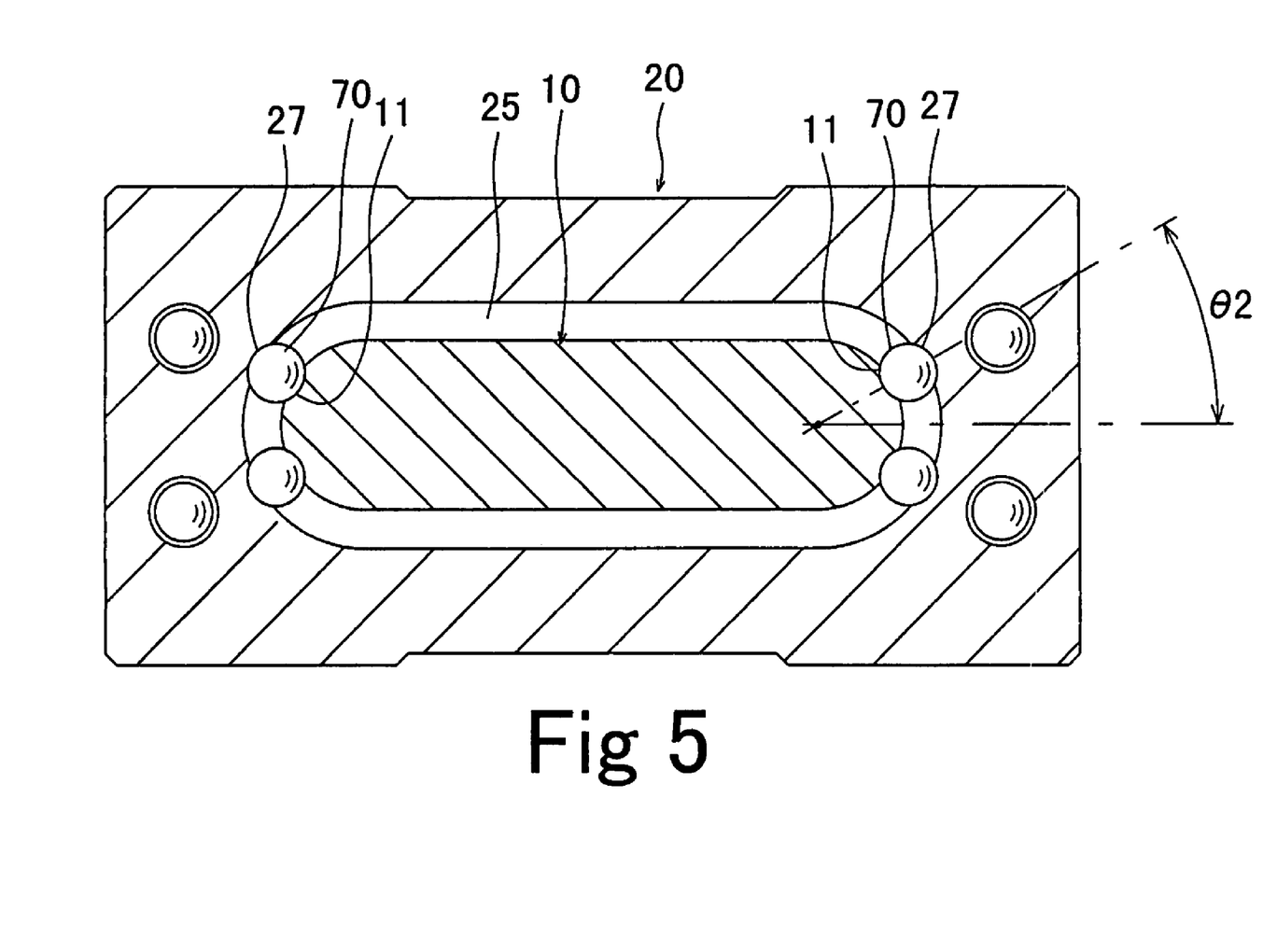
FIG. 5 is a cross-sectional view of the rolling guide device in which machining positions alone of the rolling member rolling surface 11 and the loaded rolling member rolling surface 27 are changed.

On the other hand, in the present invention, as described above, since the sectional shape at right angles to the longitudinal direction of the rail 10 and the sectional shape of the opening 25 are formed into a mutually geometrically similar ellipse, that is, a longitudinal shape, the clearance dimension of the outer peripheral surface of the rail 10 and the inner peripheral surface of the opening 25 is about the same in any part. Therefore, as shown in FIG. 4 and FIG. 5, even if the same rail and block as the rail 10 and block 20 are used, the machining positions of the rolling member rolling surface 11 and the loaded rolling member rolling surface 27 can be changed to various positions (various positions of a contact angle θ)according to purposes of use. Groove machining of the rolling member rolling surface 11 and the loaded rolling member rolling surface 27 is easy because it can be accomplished by grinding only. That is, according to purposes of use, by changing the machining positions of both the rolling member rolling surface 11 and the loaded rolling member rolling surface 27 appropriately, it is possible to optionally change the contact angle θ (θ1, θ2) of the ball 70 to the rail 10 and the block 20.

However, in the present embodiment, the sectional shape at right angles to the longitudinal direction of the rail 10 and the sectional shape of the opening 25 of the block 20 are mutually formed into continuous arc shape, that is, a curved line with respect to a part in which the rolling member rolling surface 11 and the loaded rolling member rolling surface 27 are formed.

In this manner, by forming the part of both sectional shapes into a curved line, it is possible to easily change the contact angle simply by changing the positions of the rolling member rolling surface 11 and the loaded rolling member rolling surface 27 as described above. Incidentally, both or one of the part of rail sectional shape and block sectional shape is a straight line, changing the contact angle is not always easy.

In the present embodiment, the aforesaid curved line is a continuous arc shape, that is, part of a round shape. If the curved line is a round shape, the relation of the position and the contact angle of the aforesaid rolling member rolling surface 11 and loaded rolling member rolling surface 27 becomes most important, since the position of each rolling surface can be changed highly accurately, it is also possible to change and set the contact angle with a high accuracy.

In addition, the aforesaid curved line may be a part of an elliptical shape. In the case of an ellipse, though the relation of the aforesaid rolling member rolling surface 11 and loaded rolling member rolling surface 27 to the contact angle is not so simple as the case of the aforesaid round shape, it is possible to change the contact angle in proportion to the round shape.

Figure 6:
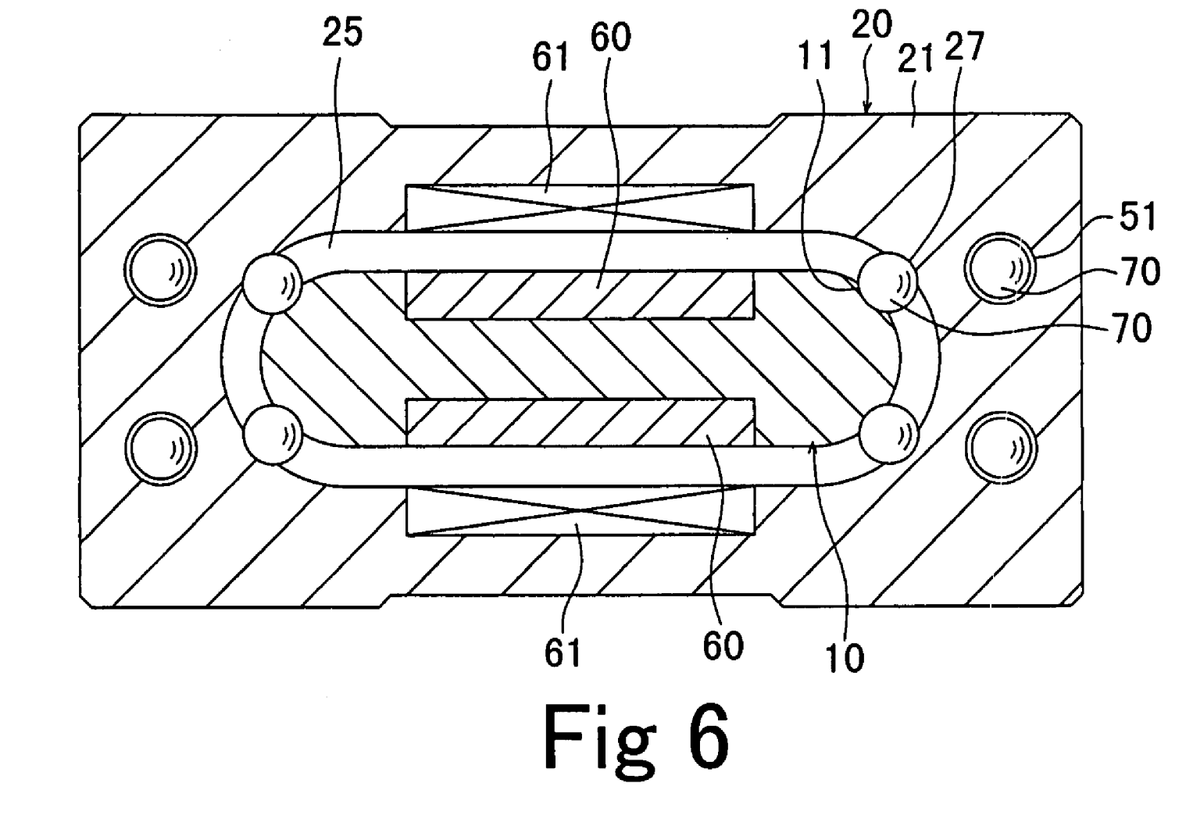
FIG. 6 is a cross-sectional view showing a driving device according to the present invention.

FIG. 6 is a transverse sectional view showing a driving device according to the present invention. This driving device is constituted so that magnets (secondary side (secondary conductor)) 60, 60 are installed so as to be respectively embedded on top and bottom surfaces (principal both surfaces) of the rail 10 of the rolling guide device of the same construction shown in the FIG. 4, and on the other hand, electromagnets (primary side (stator)) 61, 61 are installed so as to be embedded on top and bottom surfaces of the inner periphery of the opening 25 of the block 20. A linear motor formed by a pair of the magnet 60 and the magnet 61 of the upper side, and a linear motor formed by a pair of the magnet 60 and the magnet 61 of the lower side are provided at a position vertically symmetrical to the center of the rail 10. As a linear motor, motors of various construction such as a linear direct current motor and a linear pulse motor can be applied. And, by flowing current to the electromagnets 61, 61, the rail 10 is drive so as to advance and reverse to the block 20.

In this embodiment, since the rail 10 is covered by the opening 25 provided in the block 20, it is possible to provide a position to install the magnet 60 and the electromagnet 16 not only on the upper surface side but also on the lower surface side, that is, on the principal both sides of the rail 10. Therefore, it is possible to restrain a deformation of a structural member in the radial direction due to magnet attraction, so that thrust is increased by space saving because of two pairs of motors used.

Figure 7:
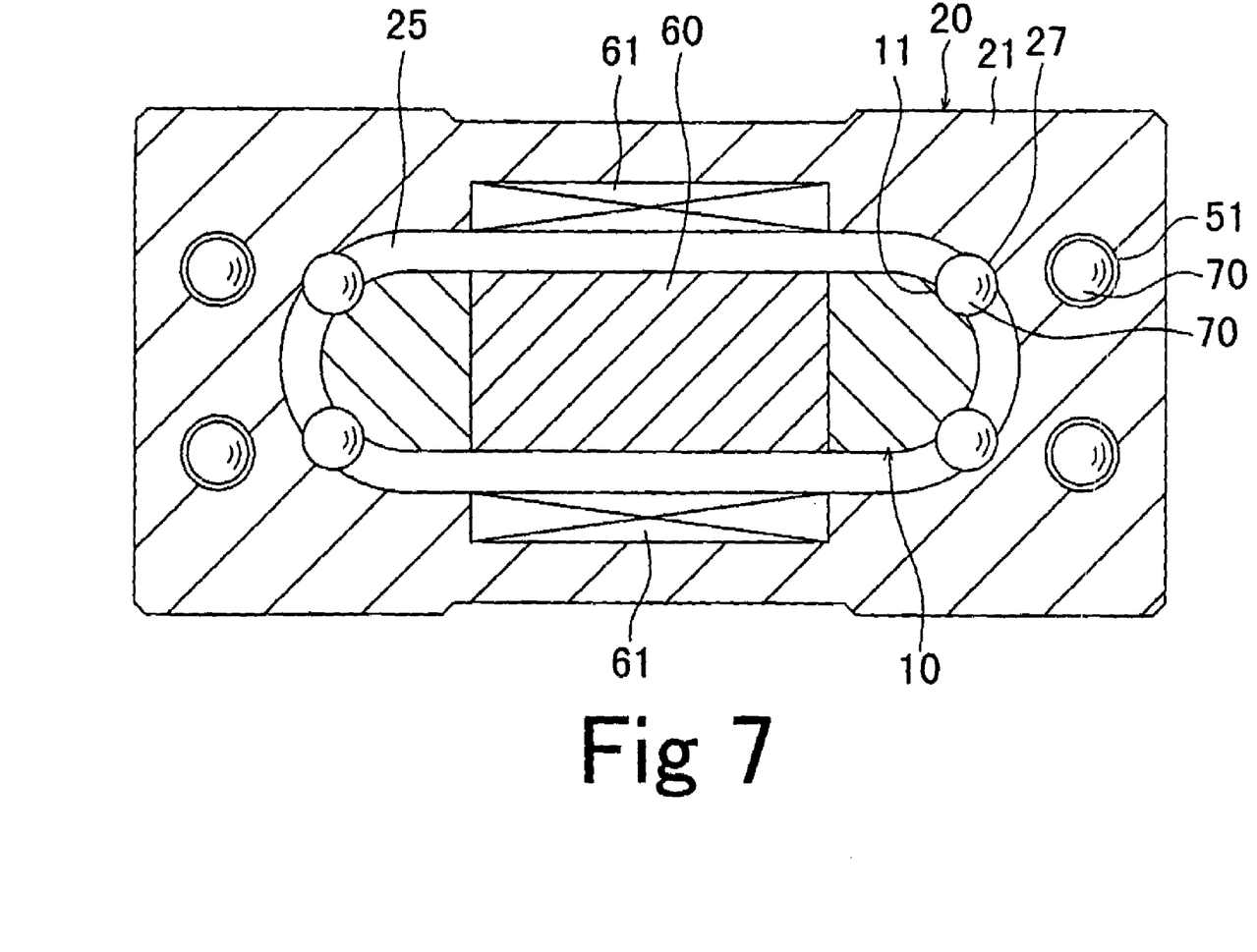
FIG. 7 is a cross-sectional view showing another driving device according to the present invention.

FIG. 7 shows an embodiment in which the magnets 60, 60 of the inside and outside of the rail 10 shown in FIG. 6 are integrated into one magnet. If the fastening between the rail 10 and the magnet 60 can be securely provided by adhesion or bolting and the like, such means simplifies the construction and reduces the cost.

Embodiments of the present invention are described in the above, but the present invention is not limited to the aforesaid embodiments, and various modifications are possible within the scope of the claims and the scope of technical idea stated in the specification and drawings. In addition, even in the case of any shape or construction or quality of material or method of use which are not directly stated in the specification and drawings, as long as they demonstrate the action and effect of the present invention, they are within the scope of the technical idea of the present invention.

For example, in the aforesaid embodiments, the block 20 is used as the fixed side, and the rail 10 is used as the movable side, conversely, the block 20 may be used as the movable side, and the rail 10 may be used as the fixed side.

Further, in the aforesaid embodiments, the sectional shape at right angles to the longitudinal direction of the rail 10 and the sectional shape of the opening 25 of the block 20 are mutually formed into round shape or a part of an elliptical shape, that is, a curved line, but other curved line may be applicable.

Furthermore, in the above embodiments, a case is shown in which balls are used as rolling members, but the present invention may be applicable to the case where rollers are used in a similar construction.

What is claimed is:

1. A rolling guide device comprising:

a rail having upper and lower surfaces which are substantially parallel planes, sides which protrude from said substantially parallel planes in a continuous arc shape, and a rolling member rolling surface formed along a longitudinal direction of said rail;

a block having an opening in which the rail is fitted and a rolling member circulation passage including a loaded rolling member rolling surface corresponding to the rolling member rolling surface of the rail; and a plurality of rolling members disposed and housed in the rolling member circulation passage and circulating in accordance with the relative movement of the rail and block, wherein a sectional shape at right angles to the longitudinal direction of the rail and a sectional shape of the opening of the block are formed into a mutually geometrically conforming longitudinal shape, with a uniform clearance between the rail and the block in the opening except between the rolling member rolling surface and the corresponding loaded rolling member rolling surface.

2. The rolling guide device according to claim 1, wherein the sectional shape at right angles to the longitudinal direction of the rail and the sectional shape of the opening of the block are mutually formed into said continuous arc shape with respect to a part in which the rolling member rolling surface and loaded rolling member rolling surface are formed.

3. The rolling guide device according to claim 2, wherein said continuous arc share is part of a round shape.

4. The rolling guide device according to claim 2, wherein said continuous arc shape is a part of an ellipse.

5. A manufacturing method of a rolling guide device comprising the steps of:

forming a rolling member rolling surface on a rail along the longitudinal direction, said rail having upper and lower surfaces which are substantially parallel planes and sides which protrude from said substantially parallel planes in a continuous arc shape, forming a rolling member circulation passage including a loaded rolling member rolling surface corresponding to said rolling member rolling surface of said rail on a block in which an opening is machined;

inserting the rail into the opening of the block, and disposing and housing, in the rolling member circulation passage, a plurality of rolling members which circulate in accordance with the relative motion of the rail and block; and providing a sectional shape at right angles to the longitudinal direction of the rail and a sectional shape of the opening of the block machined in advance into a mutually geometrically conforming longitudinal shape with a uniform clearance between the rail and the block in the opening, except between the rolling member rolling surface and the corresponding loaded rolling member rolling surface, and wherein a contact angle of the rolling members to the block and rail is capable of being changed by machining positions of both the loaded rolling member rolling surface of the block and the rolling member rolling surface of the rail at any position on the sectional shapes.

6. A driving device including a rolling guide device comprising:

a rail having upper and lower surfaces which are substantially parallel planes, sides which protrude from said substantially parallel planes in a continuous arc shape, and a rolling member rolling surface formed along a longitudinal direction of said rail;

a block having an opening in which the rail is fitted and a rolling member circulation passage including a loaded rolling member rolling surface corresponding to the rolling member rolling surface of the rail;

a plurality of rolling members disposed and housed in the rolling member circulation passage and circulating in accordance with the relative motion of the rail and block, wherein a sectional shape at right angles to the longitudinal direction of the rail and a sectional shape of the opening of the block are formed into a mutually geometrically conforming longitudinal shape, with a uniform clearance between the rail and the block in the opening except between the rolling member rolling surface and the corresponding loaded rolling member rolling surface; and a linear motor comprising at least one magnet formed in said rail, and a plurality of electromagnetic stators formed in said block.

* * * * *